(12) United States Patent
van der Meijden et al.

(10) Patent No.: US 8,603,202 B2
(45) Date of Patent: Dec. 10, 2013

(54) DEVICE FOR PRODUCING A PRODUCT GAS FROM BIOMASS

(75) Inventors: Christiaan Martinus van der Meijden, Den Helder (NL); Abraham van der Drift, Castricum (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 1117 days.

(21) Appl. No.: 12/065,689

(22) PCT Filed: Sep. 5, 2006

(86) PCT No.: PCT/NL2006/050218
§ 371 (c)(1),
(2), (4) Date: Mar. 4, 2008

(87) PCT Pub. No.: WO2007/061301
PCT Pub. Date: May 31, 2007

(65) Prior Publication Data
US 2008/0196306 A1    Aug. 21, 2008

(30) Foreign Application Priority Data

Sep. 5, 2005  (NL) .................................... 1029886
Sep. 19, 2005  (NL) .................................... 1029979

(51) Int. Cl.
*B01J 7/00*      (2006.01)
(52) U.S. Cl.
USPC ............................................................ 48/61

(58) Field of Classification Search
USPC ................................................. 48/62 R–62 A
See application file for complete search history.

(56) References Cited

U.S. PATENT DOCUMENTS

| | | | | |
|---|---|---|---|---|
| 4,778,660 A | * | 10/1988 | Haddad et al. | 422/144 |
| 4,816,137 A | * | 3/1989 | Swint et al. | 208/154 |
| 4,948,387 A | | 8/1990 | Martin et al. | |
| 6,814,940 B1 | * | 11/2004 | Hiltunen et al. | 422/141 |

FOREIGN PATENT DOCUMENTS

| | | |
|---|---|---|
| CH | 614132 A5 | 11/1979 |
| DE | 2425963 A1 | 12/1975 |
| EP | 0435424 A1 | 7/1991 |
| FR | 2530793 A1 | 1/1984 |
| WO | 0240618 A1 | 5/2002 |
| WO | 2005037422 A1 | 4/2005 |

\* cited by examiner

*Primary Examiner* — Imran Akram
(74) *Attorney, Agent, or Firm* — The Webb Law Firm

(57) ABSTRACT

A device for producing a product gas from biomass includes a reactor which is delimited by a base part and reactor walls. The reactor walls include a circumferential wall and an upper wall. The reactor includes a supply opening for the supplying of biomass, and also at least one riser for the chemical conversion of supplied biomass to a product gas and a solid substance. The riser is attached within the circumferential wall and includes an upper end and a lower end. The reactor also has a discharge opening for the discharging of the product gas. The riser is fastened to at least one reactor wall. The base wall of the reactor has a through-opening through which the lower end of the riser movably extends.

18 Claims, 2 Drawing Sheets

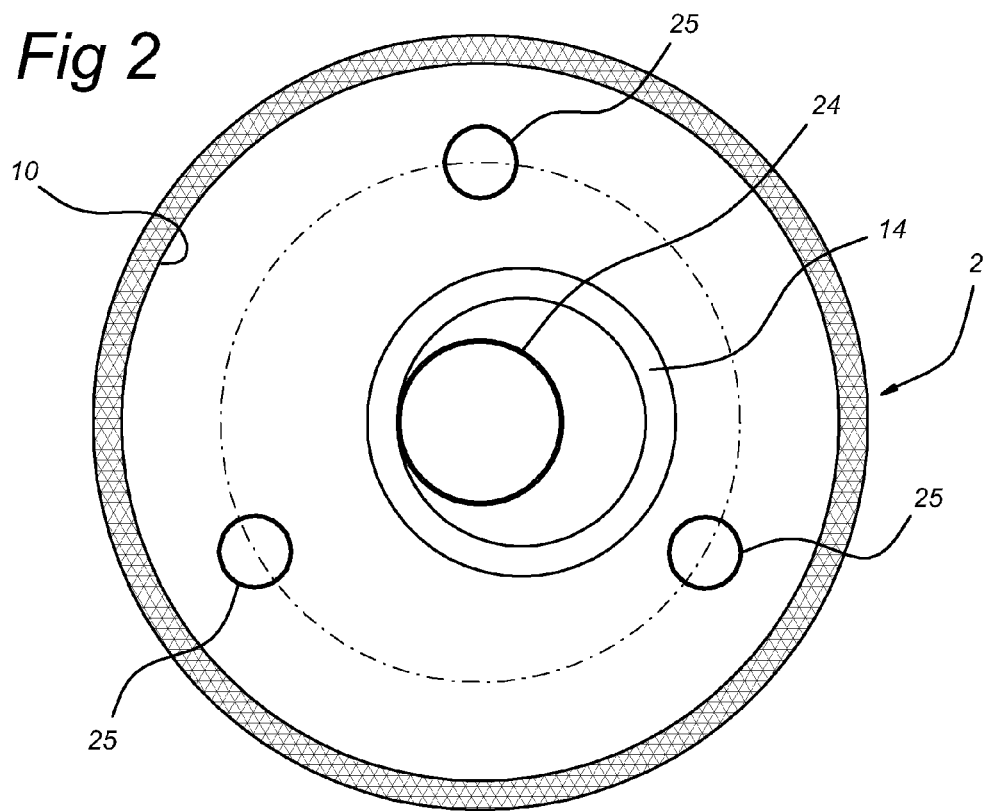
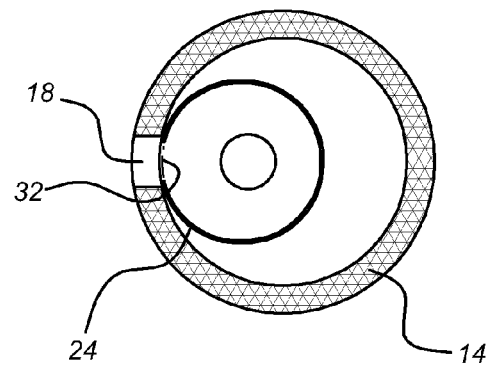

DEVICE FOR PRODUCING A PRODUCT GAS FROM BIOMASS

BACKGROUND OF THE INVENTION

1) Field of the Invention

The invention relates to a device for producing a product gas from biomass, comprising a reactor which is delimited by a base part and reactor walls, which reactor walls comprise a circumferential wall and an upper wall, which reactor comprises:
- a supply opening for the supplying of biomass,
- at least one riser for the chemical conversion of supplied biomass to at least a product gas, which riser is attached within the circumferential wall and comprises an upper end and a lower end, and also
- a discharge opening for the discharging of the product gas.

2) Description of Related Art

A device of this type is known. The biomass supplied to the riser usually comprises 80% by weight of volatile constituents and 20% by weight of substantially solid carbon or char. Heating said biomass supplied to the riser to an appropriate temperature in an atmosphere having a low oxygen content or containing no oxygen causes pyrolysis and gasification in the riser. Said appropriate temperature in the riser is usually greater than 800° C., for example between 850 and 900° C.

Pyrolysis of the volatile constituents produces a product gas. The product gas is, for example, a gas mixture comprising $CO$, $H_2$, $CH_4$ and optionally higher hydrocarbons. After further treatment, this combustible product gas is suitable to serve as a fuel. The char present in the biomass will, in conjunction with the low gasification rate, gasify in the riser merely to a limited extent. The char is therefore usually burned separately in the reactor. Moreover, pyrolysis and gasification can result in the release of various undesired substances such as tar.

During start-up of the installation, the temperature rises within a relatively short time from chamber temperature to pyrolysis and gasification temperature. The riser is therefore subject to considerable thermal expansion. This can result in damage to the riser, such as the formation of cracks.

SUMMARY OF THE INVENTION

An object of the invention is to provide a device for producing a product gas from biomass wherein the risk of damage resulting from thermal expansion of the riser is reduced.

According to the invention, this object is achieved in that the riser is fastened to at least one reactor wall and the base part of the reactor has a through-opening through which the lower end of the riser movably extends. The riser is, in accordance with the invention, suspended from the circumferential wall or the upper wall, for example with the upper end thereof. The lower end of the riser is able, under the influence of thermal expansion, to move freely, in the longitudinal direction of the riser, with respect to the base part of the reactor. The riser is accordingly able to expand freely at the lower end thereof—thermal expansion of the riser is accommodated at the underside of the reactor. The risk of damage is thus reduced.

According to the invention, the through-opening between the riser and the base part is preferably sealed by a sealing component or means for the sealing of the interior of the reactor from the environment, the sealing means being configured in such a way that the riser is able to move, as a result of thermal expansion thereof, along the sealing means. The reactor defines an interior wherein the riser is attached. The sealing means provides a seal of the through-opening between the riser and the base part, whereas the riser is able to expand freely along said sealing means.

The sealing means may be configured in various ways. For example, the sealing means comprises a gland packing. A gland packing has a deformable sealing element. Tightening at least one bolt presses the sealing element thus deformed with biasing against both the outer wall of the riser and the base part of the reactor. The through-opening between the riser and the base part is then sealed, whereas the lower end of the riser is displaceable or slidable along the packing. The riser is thus able to expand freely as a result of a change in temperature, whereas the interior of the reactor is adequately sealed from the environment.

In an advantageous embodiment of the invention, at least one nozzle for the injection of a fluidisation gas is attached in the riser, the sealing means being attached substantially below said nozzle. During operation, the riser is partially filled with a granular material, such as grains of sand, which, under the influence of the fluidisation gas, fluidises above the nozzle. The fluidised bed of sand above the nozzle is a heat conductor. The temperature in the fluidised sand bed is therefore substantially homogeneous. Said temperature of the sand bed is relatively high, for example greater than 800° C., such as between 850 and 950° C. However, below the nozzle in the riser, the sand forms a "dead zone" in which the sand is substantially quiescent. In contrast to a fluidised sand bed, quiescent sand is a heat insulator. A considerable temperature gradient is thus produced in the vertical direction of the riser—the temperature of the sand in the riser gradually decreases to ambient temperature toward the bottom. As the sealing means is located, in accordance with this advantageous embodiment of the invention, below the nozzle for the fluidising of the sand bed, the sealing means is located at a "cold" portion of the riser. The seal of the riser is accordingly itself also relatively cold. The relatively low temperatures of the sealing means simplify handling of said sealing means.

It should be noted that the temperature of the "cold" portion of the riser can still be 300° C. or greater. This temperature is, in any case, lower than the temperature of the riser at the level of the fluidised sand bed. Depending on the height of the layer of quiescent sand below the nozzle, the temperature can be reduced in such a way that the bolts of the gland packing can be tightened.

According to the invention, it is possible for the fluidisation gas in the riser to be formed by steam or carbon dioxide ($CO_2$). Steam and carbon dioxide ($CO_2$) are beneficial owing to the merely limited presence or even absence of nitrogen. Other gases having a low nitrogen content are also suitable. However, depending on the application, the type of biomass supplied and the specifications of the product gas to be produced, other fluidisation gases can be used.

In an embodiment of the invention, the riser is open at the upper end thereof, the reactor comprising a rest chamber between the open upper end of the riser and the upper wall. The rest chamber forms a reservoir having a relatively large volume. During operation, the product gas formed in the riser and the entrained solid substances, including char and sand, discharge into the rest chamber. This will reduce the rate thereof. After all, the through-flow surface area of the rest chamber is much greater than the through-flow surface area of the riser. The solid substance from the riser will therefore fall back under the influence of gravity.

The discharge opening may, in this regard, be formed in the upper wall, which discharge opening is substantially aligned with the open upper end of the riser. If the rest chamber is sufficiently high, gravity adequately prevents relatively large solid particles from reaching the discharge opening for discharging the product gas. In fact, fine dust particles can still be discharged, along with the product gas, via the discharge opening. In practice, the product gas will therefore be subsequently treated. Said subsequent treatment includes, for example, cooling, dedusting and the removal of tar.

In an advantageous embodiment, the reactor is provided with a combustion chamber which is separated from the rest chamber by a partition and also at least one downcomer extending from the partition into the combustion chamber. The downcomer provides a connection between the rest chamber and the combustion chamber. In addition, the combustion chamber is hermetically separated from the rest chamber by the partition. During operation, the solid substance which is produced by pyrolysis and gasification and grains of sand which entered the rest chamber via the riser are conveyed back to the combustion chamber via the downcomer. The char then burns in the combustion chamber, thus producing flue gases and ashes.

According to the invention, the reactor preferably comprises a plurality of downcomers distributed uniformly over the reactor. The reactor may, for example, have two, three, four, five or more downcomers. The use of a plurality of downcomers improves the mixing during operation of the granular material, such as grains of sand, in the combustion chamber.

According to the invention, the risers and downcomers of the reactor can be configured in various ways. According to the invention, the riser can, for example, be attached substantially centrally within the circumferential wall of the reactor, the downcomers being positioned so as to be radially set apart from the riser. In this case, the riser and the downcomers are uniformly distributed, viewed in cross section, within the circumferential wall of the reactor.

In an advantageous embodiment of the invention, the riser, the one or more downcomers and the partition are formed integrally as a frame which is suspended from at least one of the reactor walls of the reactor. The frame is preferably made from metal, such as steel. The steel frame is fastened, at the upper side thereof, to the circumferential wall and/or the upper wall of the reactor. At the underside of the steel frame, the riser and the downcomers are able to expand freely. The lower end of the downcomers is in this case above the base part of the reactor, whereas the riser according to the invention protrudes through said base part.

According to the invention, it is possible for the combustion chamber to comprise a plurality of nozzles for the supplying of fluidisation air. The nozzles are preferably located in proximity to the base part of the reactor. During operation, the combustion chamber is partially filled with a granular material, such as grains of sand. The combustion chamber, like the riser, contains a bed of sand. The supplying from below of the fluidisation air causes said sand bed to fluidise above the nozzles. The temperature in the fluidised sand bed is substantially homogeneously distributed. Said temperature is usually greater than 900° C., for example 950° C. The char, which is supplied to the combustion chamber via the downcomer, burns in said fluidisation bed consisting of hot grains of sand. The fluidisation air also acts in this case as combustion air.

According to the invention, the circumferential wall of the reactor preferably comprises at a distance above the nozzles of the combustion chamber at least one intake opening for the introduction of secondary air. The intake opening or intake openings are therefore at a height above the base part. The supply of secondary air leads to effective after-burning, and this beneficially influences the characteristics of the flue gases and ashes formed during combustion.

In an embodiment of the invention, the circumferential wall has at least one outlet opening for the issuing of flue gases formed by combustion. The outlet opening for flue gases is in this case preferably positioned laterally. The flue gases discharged via the outlet opening are usually subjected to after-treatment, for example cooling and/or dedusting.

In an advantageous embodiment of the invention, the base part of the reactor comprises a first base wall portion which is connected to the underside of the circumferential wall of the reactor and also a circumferential wall portion which extends downward from the first base wall portion and the circumference of which is smaller than the circumference of the circumferential wall of the reactor, the riser extending in the circumferential wall portion and the base part having a second base wall portion connected to the underside of the circumferential wall portion, and the through-opening for the lower end of the riser being formed in the second base wall portion. The second base wall portion of the base part is therefore located radially within and below the first base wall portion thereof. The first base wall portion of the base part forms the base of the combustion chamber. As a result of the use of the protruding circumferential wall portion, the lower end of the riser is located below the combustion chamber.

The supply opening for the supplying of biomass is preferably formed between the base of the combustion chamber and the second base wall portion of the circumferential wall portion. In other words, the supply opening is located below the base of the combustion chamber, thus allowing the feed channel connected to the supply opening to run below the combustion chamber instead of through the combustion chamber. The supplying of biomass to the riser is therefore simple.

The riser may in this case be attached eccentrically with respect to the circumferential wall portion, the supply opening for the supplying of biomass being formed laterally in the circumferential wall portion and the riser having a lateral feed opening connected to the supply opening. In this case, it is impossible for biomass to escape between the supply opening in the reactor and the feed opening in the riser.

According to the invention, it is possible for the riser to be provided with at least one through-opening for the passage of granular material, such as grains of sand, and wherein there extends between the riser and the circumferential wall a channel which connects the through-opening in the riser to the combustion chamber. During operation, the grains of sand circulate in the reactor. The gases formed in the riser entrain the grains of sand out of the fluidised bed of the riser into the rest chamber. From the rest chamber, the grains of sand fall back to the fluidisation bed consisting of grains of sand in the combustion chamber via the downcomer or downcomers. The grains of sand are then able to flow back to the riser via the channel.

According to an embodiment of the invention, the base part comprises at least one funnel which is provided at its pointed lower end with a draining component or means for the draining of granular material, such as grains of sand. In practice, the biomass supplied to the reactor contains impurities, for example stones, nails or pieces of glass. Said impurities enter the sand bed of the riser or the combustion chamber. The impurities fall downward in the sand bed, into the respective funnels. Sand is then drained via the draining means, from which the impurities are removed. The purified sand is then conveyed back into the reactor, so the sand bed in the riser and the combustion chamber remains in optimum condition.

The invention will now be described in greater detail with reference to an illustrative embodiment represented in the drawings, in which:

BRIEF DESCRIPTION OF THE DRAWINGS

FIG. 2 is a cross section along the line II-II in FIG. 1;
and
FIG. 3 is a cross section along the line III-III in FIG. 1.

DETAILED DESCRIPTION OF THE EMBODIMENTS

Figure 1:
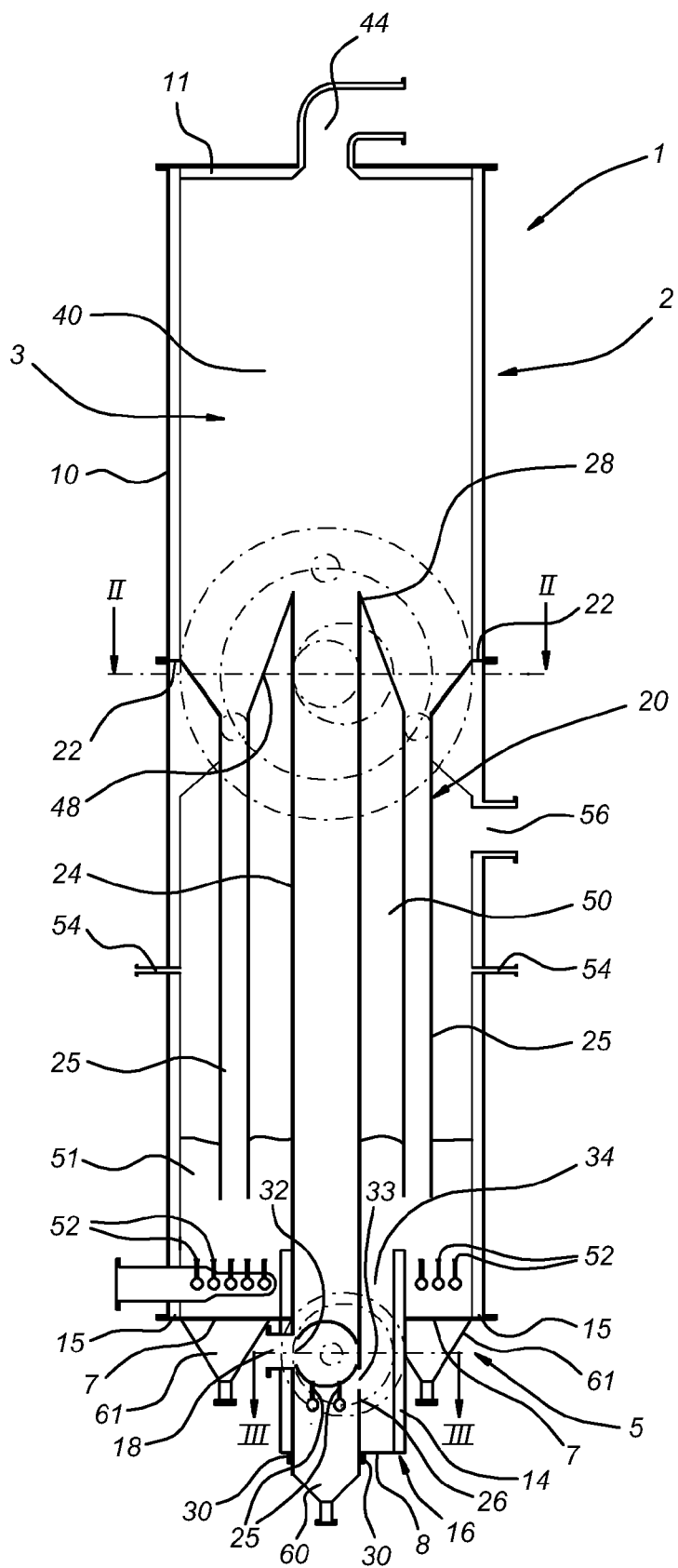
FIG. 1 is a cross section of the device for producing a product gas from biomass according to the invention.

The device for producing a product gas from biomass according to the invention is denoted in its entirety by reference numeral 1. Generally, 80% by weight of biomass consists of volatile constituents. Heating the biomass to a pyrolysis temperature, for example 850° C., causes said volatile constituents to be released relatively quickly. Chemical reactions then produce CO, $H_2$ and hydrocarbons. The remaining 20% by weight of biomass consists substantially of solid carbon or char. The gasifying of char at 850° C. is very time-consuming but the burning thereof takes place particularly quickly. The device 1 forms an indirect or allothermal gasifier, combining gasification for the volatile constituents and combustion for the char. Indirect gasification converts biomass to a product gas which is suitable as a fuel for, for example, boilers, gas engines and gas turbines.

The device 1 comprises a reactor 2 which is delimited by a base part 5, a circumferential wall 10 and an upper wall 11. The circumferential wall 10 and the upper wall 11 are illustrated in this case as reactor walls. Said reactor walls 10, 11 are brick walls. The reactor walls 10, 11 and the base part 5 of the reactor 2 surround an interior 3 wherein biomass can be treated.

Within the reactor 2, a frame 20 is suspended from the circumferential wall 10. The frame 20 has, for this purpose, laterally extending flanges 22 which are fastened to the circumferential wall 10 using bolts or other fastening means. The frame 20 is made from metal, for example steel. Obviously, the frame 20 can also be suspended from the upper wall 11 (not shown).

The frame 20 has a partition 48 which divides the interior 3 of the reactor into two areas 40, 50 which are substantially separated from each other. Said mutually separated areas form a rest chamber 40 and a combustion chamber 50 respectively. The frame 20 further comprises a riser 24 and three downcomers 25. The riser 24 and the downcomers 25 are attached in the partition 48. The combustion chamber 50 and the rest chamber 40 are interconnected merely via the riser 24 and the downcomers 25. In other words, the partition 48 extends between the riser 24 and the downcomers 25.

According to the invention, the number of downcomers may vary—for example, the frame has five downcomers (not shown). The riser 24 comprises a lower end 26 and an upper end 28. As shown in FIG. 3, the downcomers 25 are distributed uniformly over the circumference of the reactor 2.

During operation, the combustion chamber 5S contains a fluidised bed consisting of granular inert material, for example a sand bed 51. A plurality of nozzles 52 for the supplying of fluidisation air are accordingly attached in the combustion chamber 50. The fluidisation air also serves in this case as combustion air. The circumferential wall 10 of the reactor 2 has a plurality of lateral intake openings 54 for the supplying of secondary air to the combustion chamber 50. Said intake openings 54 are formed at a distance above the sand bed 51.

The burning of char in the combustion chamber 50 produces flue gases and ashes. A considerable amount of heat is released as a result. The temperature of the fluidised sand bed in the combustion chamber 50 is, for example, about 950° C. The riser 24 is surrounded by the hot combustion chamber 50, so the riser 24 is also heated. The flue gases leave the combustion chamber 50 via a lateral outlet opening 56 extending in the circumferential wall 10 of the reactor 2.

During operation, the riser 24 also contains a fluidised bed consisting of granular inert material, such as a sand bed. The riser 24 accordingly has a plurality of nozzles 25 for the supplying of fluidisation gas. The fluidisation gas is preferably steam, $CO_2$ or another gas having a low nitrogen content. Biomass to be treated is brought into the fluidisation bed of the riser 24. For this purpose, the reactor 2 has a supply opening 18 for the supplying of biomass and the riser 24 has a feed opening 32 connected to the supply opening 18 in the reactor 2.

During operation, pyrolysis and gasification of biomass take place in the riser 24. The temperature in the riser 24 is then from 850 to 900° C. The gases produced during gasification provide an upward rate of the biomass flow in the riser 24. Said gases entrain solid substances, including the char and grains of sand from the sand bed of the riser 24. The fluidisation gas supplied from the nozzles 25 makes merely a limited contribution to the rising of the product gas and the solid substance. The upper end 28, facing away from the lower end 26, of the riser 24 is open. The open upper end 28 of the riser 14 opens into the rest chamber 40. The rest chamber 40 extends between the riser 24 and the upper wall 11 of the reactor 2. The upper wall 11 comprises a discharge opening 44 for the discharging of product gas produced in the riser 24.

From the rest chamber 40, the solid substances entrained from the riser 24, including char and grains of sand, fall back downward via the downcomers 25. The char and the sand then enter the combustion chamber 50. The char burns in the combustion chamber 50 as described hereinbefore. The sand from the sand bed in the combustion chamber 50 is able to flow to the sand bed in the riser 24.

In this illustrative embodiment, the base part 5 of the reactor 2 has a first base wall portion 7 which is connected to the lower edges 15 of the circumferential wall 10. A downwardly protruding circumferential wall portion 14 is fastened centrally in the base wall portion 7. The diameter of the circumferential wall portion 14 is smaller than the diameter of the circumferential wall 10. The circumferential wall portion 14, like the reactor walls 10, 11, is formed by a brick wall. A second base wall portion 8 is fastened to the underside 16 of the circumferential wall portion 14.

The riser 24 is accommodated in the circumferential wall portion 14. The diameter of the riser 24 is smaller than the diameter of the circumferential wall portion 14. The second base wall portion 8 of the base part 5 contains a through-opening for the riser 24. The lower end 26 of the riser 24 protrudes freely through said through-opening. The riser 24 is therefore not fastened to the base wall portion 8. This allows the riser 24 to expand freely at the lower end 26 thereof.

The diameter of the through-opening is somewhat larger than the diameter of the riser 24. Between the riser 24 and the base wall portion 8 there is a clearance which facilitates the free expansion of the riser 24. A sealing means 30 is attached in said D clearance. The through-opening in the base wall portion 8, i.e. the connection between the riser 24 and the base wall portion 8, is substantially hermetically sealed by said sealing means 30, thus closing the interior 3 of the reactor 2 from the environment.

The sealing means 30 is configured in such a way that the sealing means 30 is able to accommodate thermal expansion of the riser 24 during operation of the device 1. The lower end 26 of the riser 14 can, for example, move along the sealing means 30 while preserving the sealing effect thereof. According to the invention, it is possible for the riser 14 to expand as a result of changes in temperature, whereas the sealing of the reactor 2 from the environment remains adequately ensured. In this illustrative embodiment, the sealing means 30 is formed by a gland packing. However, the sealing means 30 may be configured in a different manner.

As shown in FIG. 1, the sealing means 30 is located below the outflow nozzles 25 in the riser. The sand below the nozzles 25 is substantially stationary. As quiescent sand is an excellent heat insulator, the temperature in the sand bed below the nozzles 25 will decrease in tandem with depth. The greater the vertical distance from the nozzles 25, i.e. the fluidisation bed, the lower the temperature. This means that the lower end 26 of the riser 24 will be relatively cold, and this has various advantages. For example, the bolts of the gland packing may be tightened.

In the base wall portion 7 there are provided recesses which are closed by funnels 61. The riser 24 is also closed, at its lowermost head end, by a funnel 60. The sand bed of the combustion chamber 50 and the riser 24 is therefore carried by the funnels 60, 61. The funnels 60, 61 each have a draining means 63 for the draining of grains of sand. Any impurities in the sand, such as stones, may thus be removed.

The supply opening 18 in the reactor 2 for the supplying of biomass is formed laterally in the circumferential wall portion 14. The feed opening 32 in the riser 24 is aligned with the supply opening 18 in the reactor 2 (see FIG. 3). The riser 24 is accordingly located eccentrically with respect to the circumferential wall portion 14. The lateral outer wall of the riser 24 abuts, at the location of the feed opening 32, against the lateral inner wall of the circumferential wall portion 14. The risk of biomass escaping between the riser 24 and the circumferential wall portion 14 is therefore minimal.

The riser 24 also has at least one through-opening 33 for the passage of grains of sand. A channel 34 provides a connection from the sand bed of the combustion chamber 50 to the sand bed of the riser 24. The grains of sand flow through the through-opening 33 into the riser 24 via the channel 34.

Obviously, the invention is not restricted to the illustrative embodiment represented in the figures. A person skilled in the art may make various alterations without thereby departing from the scope of the invention.

The invention claimed is:

1. A device for producing a product gas from biomass, comprising a reactor which is delimited by a base part and reactor walls, which reactor walls comprise a circumferential wall and an upper wall, which reactor comprises:
   a supply opening disposed in the base part for the supplying of biomass to the reactor;
   at least one riser in fluid communication with the supply opening for the chemical conversion of supplied biomass from the supply opening to at least a product gas, which riser is attached within the circumferential wall and comprises an upper end and a lower end; and
   a discharge opening disposed in the upper wall and in fluid communication with the at least one riser for the discharging of the product gas from the riser,
   wherein the riser is fastened to at least one reactor wall and the base part of the reactor has a through-opening through which the lower end of the riser movably extends,
   wherein the through-opening has a diameter larger than a diameter of the riser and the lower end of the riser protrudes freely through the through-opening such that a clearance is formed between the riser and the base part to facilitate free expansion of the riser, and
   wherein the riser is not fastened to the base part and is able to expand freely at the lower end thereof.

2. The device according to claim 1, wherein the through-opening between the riser and the base part is sealed by a sealing component adapted for the sealing of the interior of the reactor from the environment, and wherein the sealing component is configured in such a way that the riser is able to move, as a result of thermal expansion thereof, along the sealing component.

3. The device according to claim 2, wherein the sealing component is provided with a gland packing.

4. The device according to claim 2, wherein at least one nozzle for the injection of a fluidisation gas is attached in the riser and wherein the sealing component is attached substantially below said nozzle.

5. The device according to claim 1, wherein the riser is open at the upper end thereof and wherein the reactor comprises a rest chamber between the open upper end of the riser and the upper wall.

6. The device according to claim 5, wherein the discharge opening is formed in the upper wall, which discharge opening is substantially aligned with the open upper end of the riser.

7. The device according to claim 5, wherein the reactor is provided with a combustion chamber which is separated from the rest chamber by a partition and also at least one downcomer extending from the partition into the combustion chamber.

8. The device according to claim 7, wherein the reactor comprises a plurality of downcomers distributed uniformly over the circumference of the reactor.

9. The device according to claim 8, wherein the riser is attached substantially centrally within the circumferential wall of the reactor and wherein the downcomers are positioned so as to be radially set apart from the riser.

10. The device according to claim 7, wherein the riser, the at least one downcomer and the partition are formed integrally as a frame which is suspended from at least one of the reactor walls of the reactor.

11. The device according to claim 7, wherein the combustion chamber comprises a plurality of nozzles for the supplying of fluidisation air.

12. The device according to claim 7, wherein the circumferential wall of the reactor comprises, at a distance above the nozzles of the combustion chamber, at least one intake opening for the introduction of secondary air.

13. The device according to claim 7, wherein the circumferential wall has at least one outlet opening for the issuing of flue gases formed by combustion.

14. The device according to claim 1, wherein the base part of the reactor is provided with a first base wall portion which is connected to an underside of the circumferential wall of the reactor and also a circumferential wall portion which extends downward from the first base wall portion and is smaller than the circumferential wall of the reactor, the riser extending in the circumferential wall portion and the base part having a second base wall portion connected to the underside of the circumferential wall portion, and the through-opening for the lower end of the riser being formed in the second base wall portion.

15. The device according to claim 14, wherein the supply opening for the supplying of biomass to the riser is laterally formed in the circumferential wall portion between the first base wall portion and the second base wall portion.

16. The device according to claim 14, wherein the riser is attached eccentrically with respect to the circumferential wall portion and the supply opening for the supplying of biomass being formed laterally in the circumferential wall portion and the riser having a lateral feed opening connected to the supply opening.

17. The device according to claim 14, wherein the riser is provided with at least one through-opening for the passage of granular material, such as grains of sand, and wherein there extends between the riser and the circumferential wall a channel which connects the through-opening in the riser to the combustion chamber.

18. The device according to claim 13, wherein the base part comprises at least one funnel which is provided at its pointed lower end with a draining component adapted for the draining of granular material.

* * * * *

UNITED STATES PATENT AND TRADEMARK OFFICE
CERTIFICATE OF CORRECTION

PATENT NO. : 8,603,202 B2
APPLICATION NO. : 12/065689
DATED : December 10, 2013
INVENTOR(S) : van der Meijden et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1246 days.

Signed and Sealed this
Twenty-second Day of September, 2015

Michelle K. Lee
*Director of the United States Patent and Trademark Office*